(No Model.)

F. F. N. MARAIS.
FRUIT PRESS.

No. 244,065.                    Patented July 12, 1881.

WITNESSES:
C. Neveux
C. Sedgwick

INVENTOR:
F. F. N. Marais
BY Munn & Co
ATTORNEYS.

UNITED STATES PATENT OFFICE.

FELICIE F. N. MARAIS, OF NEW YORK, N. Y.

FRUIT-PRESS.

SPECIFICATION forming part of Letters Patent No. 244,065, dated July 12, 1881.

Application filed February 28, 1881. (No model.)

*To all whom it may concern:*

Be it known that I, FELICIE F. N. MARAIS, of the city, county, and State of New York, have invented a new and Improved Hand-Press for Fruits and Vegetables, of which the following is a specification.

The object of my invention is to provide a new improved and simple press for mashing vegetables, pressing fruits, &c.

The invention consists in a cylinder closed at the bottom and provided with perforations in the sides and bottom, and mounted in a suitable supporting-frame, into which cylinder a solid plunger fits, this plunger being provided with a suitable handle.

Figure 1:
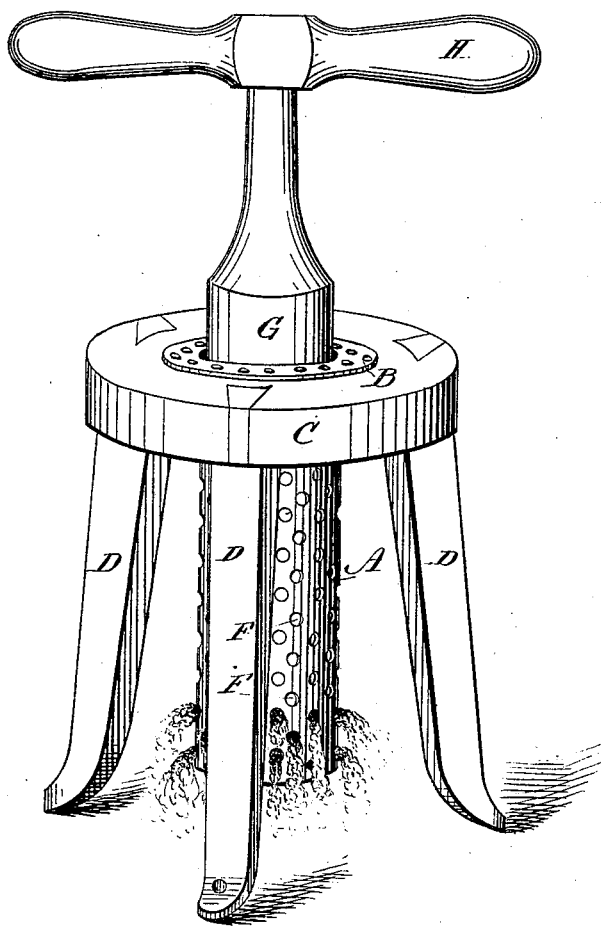
Figure 2:
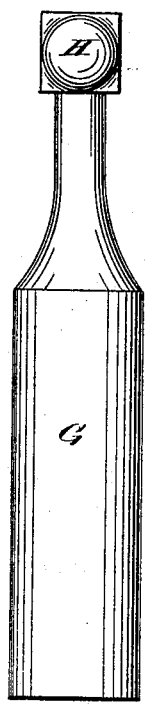
Figure 3:
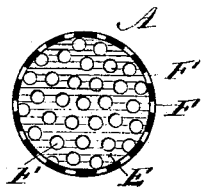

In the accompanying drawings, Figure 1 is a perspective view of my improved press. Fig. 2 is a longitudinal elevation of the plunger, and Fig. 3 a horizontal section through the cylinder.

Similar letters of reference indicate corresponding parts.

A cylinder, A, made of galvanized iron, tinned copper, or any other suitable material, has a flange, B, at the upper end, and this flange rests upon and is secured to a frame, C, supported by three or more legs, D, which are slightly bent outward at the lower end, and are provided with apertures, through which screws pass to fasten it on the table or on a suitable base, the legs D being of such height that the bottom of the cylinder will be such a distance above the base or table that a bowl or dish can be placed under the cylinder.

The frame C and the legs D may be made of wood or metal, as may be desired.

The cylinder is closed at the bottom, and the cylinder A and the bottom E are provided with numerous perforations, F F. A plunger, G, made solid, of wood or metal, fits closely in the cylinder and has the same height as the cylinder. This plunger or piston is provided with a handle, H.

The vegetables or fruits to be mashed or pressed are placed in the cylinder A and the plunger is placed on top of them. If the plunger is depressed, the fruits and vegetables are mashed and crushed, and the juice of the fruits or the mashed vegetables pass through apertures in the cylinder. As the plunger fits closely in the cylinder it is guided therein, and does not require any complicated mechanism for this purpose.

The perforated vessel need not necessarily be cylindrical, but may have any other suitable cross-section.

The plunger, which enters the cylindrical casing, substantially fills the casing, and operates to press the matter through the sides of the strainer at all points simultaneously. By means of the cross-handle the plunger can be revolved within the casing, so as to work the material through the strainer in a much easier way than by simple pressure.

The apparatus is very much simpler than the apparatus in which special power is used to drive the plunger into the strainer, which, on account of their expense and complication, have been substantially useless.

I am aware that presses with perforated vessels have been made heretofore; but the bottoms of the vessels have not been made perforated, and a complicated apparatus has been used to guide and press down the follower, whereas the essential feature of my invention is its simplicity.

Having thus described my invention, I claim as new and desire to secure by Letters Patent—

A hand-press consisting of a suspended cylindrical vessel, perforated as set forth, a plunger, G, fitting in and solely guided by said vessel, and provided with a cross-handle, whereby it can be moved vertically and rotated, as set forth.

FELICIE F. N. MARAIS.

Witnesses:
 H. N. MUNN,
 C. SEDGWICK.